United States Patent [19]

Nguyen et al.

[11] Patent Number: 5,325,520

[45] Date of Patent: Jun. 28, 1994

[54] INVOKING HARDWARE RECOVERY ACTIONS VIA ACTION LATCHES

[75] Inventors: Quang H. N. Nguyen, San Jose; Arun Shah, Saratoga; Allan J. Zmyslowski, Sunnyvale, all of Calif.

[73] Assignee: Amdahl Corporation, Sunnyvale, Calif.

[21] Appl. No.: 816,966

[22] Filed: Jan. 3, 1992

[51] Int. Cl.⁵ ............................................... G06F 11/20
[52] U.S. Cl. ..................................... 395/575; 371/11.1
[58] Field of Search ............... 395/575, 500; 371/8.1, 371/11.1, 11.3, 12

[56] References Cited

U.S. PATENT DOCUMENTS 5,153,881  10/1992  Bruckert et al. .................. 371/11.3

OTHER PUBLICATIONS

*Computer Architecture and Organization*, Second Edition, by John P. Hayes, pp. 664–667, ©1988 by McGraw Hill Inc.

*Primary Examiner*—Vincent P. Canney
*Attorney, Agent, or Firm*—Fliesler, Dubb, Meyer & Lovejoy

[57] ABSTRACT

A computer system having a number of circuits and error detection circuitry for detecting errors in the circuits and providing error signals. Error recovery is provided by detecting an error with checking logic, turning off system clocks and invoking error recovery software, executing recovery software to recover from the error and set an action latch, turning on system clocks, taking hardware recovery action in response to the action latch, resetting the action latch and continue processing. Action latches are used extensively throughout the computer system.

5 Claims, 8 Drawing Sheets

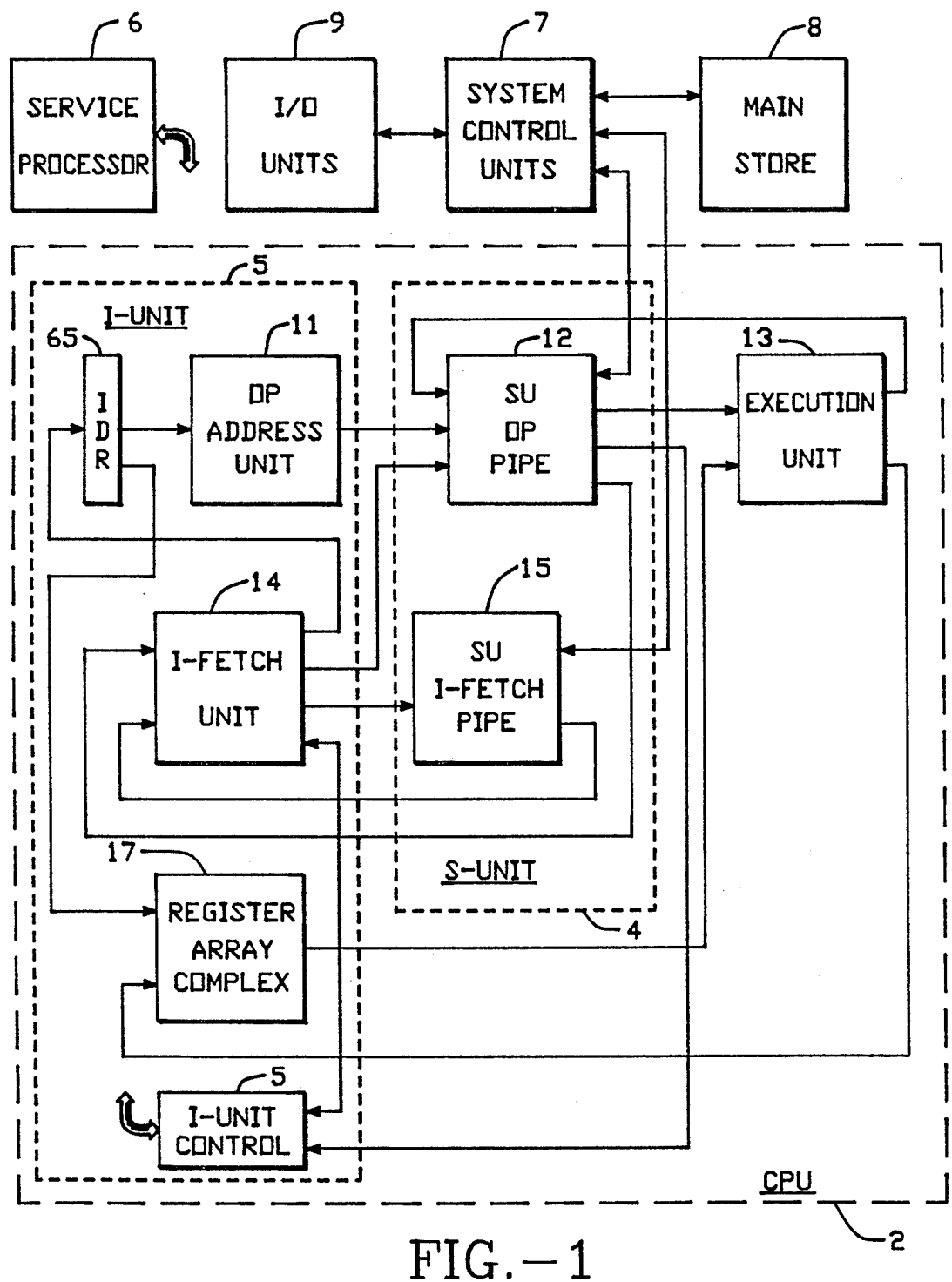
FIG.—1
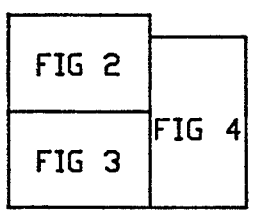

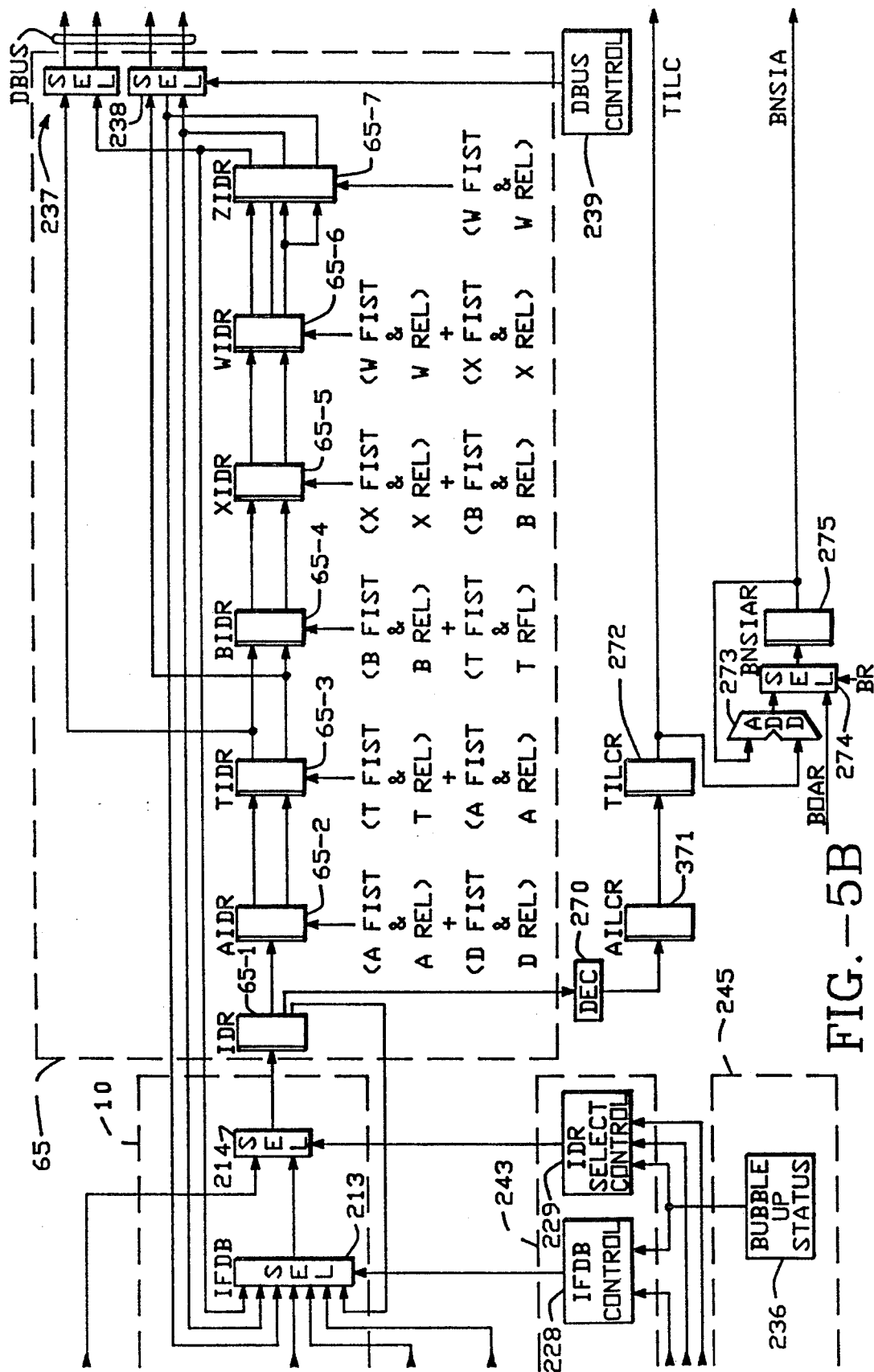
FIG.—5B

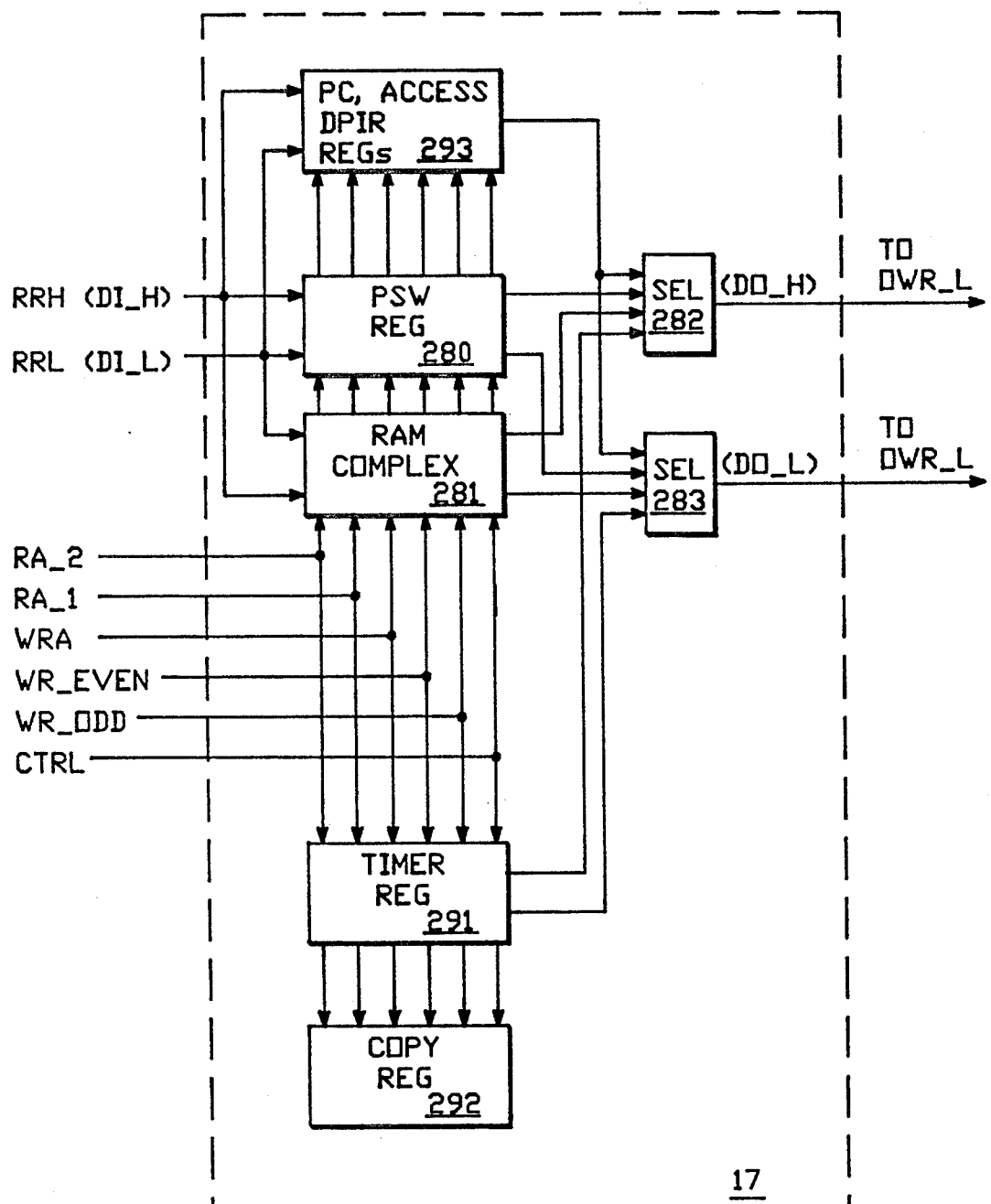
FIG.—6

INVOKING HARDWARE RECOVERY ACTIONS VIA ACTION LATCHES

CROSS REFERENCE TO RELATED APPLICATIONS

MACHINE WITH TWO UNITS OF OPERATION, Ser. No. 815,962, filed Jan. 2, 1992, Inventors Jefferson J. Connell, Vernon R. Johnson, Peter H. Lipman, Robert M. Maier, Gary Hammond, assigned to the assignee of the present invention.

This related Application is hereby incorporated by reference.

BACKGROUND OF THE INVENTION

The present invention relates to the field of computers and that operate in accordance with the IBM ESA/390 architecture and particularly to error handling and recovery of computers after an error occurs. Error recovery is important to computer system operation. Error handling in prior art computer systems has followed the process described below:

1. The error is detected by conventional checking logic and an Error History Latch is set.
2. Some small number of clock cycles later, system clocks are turned off and error recovery soft ware is invoked.
3. Recovery software, based on history information provided by the hardware, attempts to recover from the error.
4. If recovery is successful, processing continues.

Historically, error recovery software has been complex and difficult to test and validate. One of the leading causes of this problem has been the need for recovery software to issue multiple system clocks as part of its recovery actions.

The IBM ESA/390 architecture defines a number of timers and system implementations of that architecture may provide additional timers. The operation of such timers including the setting, resetting, stopping and starting becomes complex in large systems that have many different modes of operation and that operate with units of operation designated as UO in TABLE A. The IBM ESA/390 architecture defines a unit of operation that is used to control the instants when an interruption can be examined and serviced. Interruptions can occur at any point in time; however, they are only examined and serviced during the interrupt processing time, designated as IPT in TABLE A, between the end of one unit of operation and the start of the next unit of operation. TABLE A depicts the relationship between units of operation and instruction processing time.

TABLE A

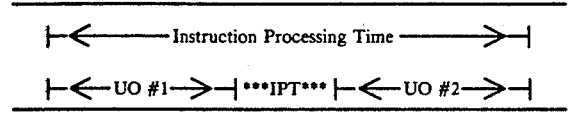

Most instructions consist of only one unit of operation. However, long and more complex or repetitive instructions such as MOVE LONG, COMPARE LOGICAL LONG, TEST BLOCK and UPDATE TREE consist of many units of operation.

The unit of operation is needed in large computer systems because of the need for having a reasonable response time for interruptions while avoiding complex instruction processing unit. If the interruptions have to be taken at any point in time during the instruction processing time, then the CPU design will be considerably more complex than if the interruptions are only taken at the end of instruction processing time.

ESA/390 architecture computers are controlled in part by a Program Status Word. The Program Status Word includes the instruction address, condition code, and other information used to control instruction sequencing and to determine the state of the computer. The active or controlling Program Status Word is called the current Program Status Word. It governs the program currently being executed.

The CPU has an interruption capability, which permits the CPU to switch rapidly to another program in response to exception conditions and external stimuli. When an interruption occurs, the CPU places the current Program Status Word in an assigned storage location, called the old Program Status Word location, for the particular class of interruption. The CPU fetches a new Program Status Word from a second assigned storage location. This new Program Status Word determines the next program to be executed. When it has finished processing the interruption, the interrupting program may reload the old Program Status Word, making it again the current Program Status Word, so that the interrupted program can continue.

The status of the CPU can be changed by loading a new Program Status Word or part of a Program Status Word. Control is switched during an interruption of the CPU by storing the current Program Status Word, so as to preserve the status of the CPU, and then loading a new Program Status Word.

A new or modified Program Status Word becomes active (that is, the information introduced into the current Program Status Word assumes control over the CPU) when the interruption or the execution of an instruction that changes the Program Status Word is completed.

A storage key is associated with each 4K byte block of storage that is available in the configuration. The storage key has the following format.

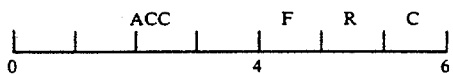

The bit positions in the storage key are allocated as follows:

Access Control Bits (ACC):

If a reference is subject to key controlled protection, the four access control bits, bits 0-3, are matched with the four bit access key when information is stored, or when information is fetched from a location that is protected against fetching.

Fetch Protection Bit (F):

If a reference is subject to key controlled protection, the fetched protection bit, bit 4, controls whether key controlled protection applies to fetch type references are monitored and that fetching with any access key is permitted; a one indicates that key controlled protection applied to both fetching and storing. No distinction is made between the fetching of instructions and of operands.

Reference Bit (R):

The reference bit, bit 5 normally is set to one each time a location in the corresponding storage block is referred to either for storing or for fetching of information.

Change bit (C):

The change bit, bit 6, is set to one each time information is stored at a location in the corresponding storage block.

Protection

Protection facilities are provided to protect the contents of main storage from destruction or misuse by programs that contain errors or are unauthorized. Key controlled protection, access list controlled protection, page protection, and low address protection are forms of protection available in ESA/390.

Key Controlled Protection

When key controlled protection applies to a storage access, a store is permitted only when the storage key matches the access key associated with the request for storage access; a fetch is permitted when the keys match or when the fetch protection bit of the storage key is zero.

The keys are said to match when the four access control bits of the storage key are equal to the access key, or when the access key is zero.

Fetch Protection Override Control

Bit 6 of control register 0 is the fetch protection override control. When the bit is one, fetch protection is ignored for locations at effective addresses 0-2047. An effective address is the address which exists before any transformation by dynamic address translation or prefixing. However, fetch protection is not ignored if the effective address is subject to dynamic address translation and the private space control, bit 23, is one in the segment table designation used in the translation.

Fetch protection override has no effect on accesses which are not subject to key controlled protected.

Access List Controlled Protection

In the access register mode, bit 6 of the access list entry, the fetch only bit, controls which types of operand references are permitted to the address space specified by the access list entry. When the entry is used in the access register translation part of a reference and bit 6 is zero, both fetch type and store type references are permitted, and an attempt to store causes a protection exception to be recognized and the execution of the instruction to be suppressed.

Page Protection

The page protection facility controls access to virtual storage by using the page protection bit in each page table entry. It provides protection against improper storing.

One of the instructions that is able to modify part of a Program Status Word is the Set Program Status Word Key From Address instruction. The ESA/390 architecture requires the Set Program Status Word Key From Address instruction to load the architecturally defined Program Status Word "access key" from four bits extracted from the effective address of the Set Program Status Word Key From Address instruction. The access key is used to limit the access of future instructions to certain storage areas to aid in providing protection and privacy of information.

One well known computer operating with the IBM ESA/390 architecture is the Amdahl 5995-A computer. In that computer, the instruction unit, I-Unit, pipeline is a six stage pipeline consisting of stages D, A, T, B, X, and W that process instructions.

One of the functions of the D stage is to collate the necessary information to reference storage in the A, T, and B stages. This D stage function includes generation of the effective address and selection of the access key to be used by the reference. The A, T, and B stages fetch operands/data using the current valid key that is defined by the architecture, Program Status Word $KEY_A$.

One of the Functions of the W stage is to write results of operations to architecturally defined registers or storage. The W stage in the pipeline comes after the fetch operands/data stages (A, T, and B) and the arithmetic functions stage X. The access key used is the key, Program Status Word $KEY_A$, from the architecturally defined Program Status Word register. After the access key in the Program Status Word has been updated in the W stage, the new key, Program Status Word $KEY_N$, is available for future operations/instructions and the new key becomes the architecturally defined key, Program Status Word $KEY_A$. The ESA/390 architecture requires that the new key be effective starting from the instruction immediately following the Set Program Status Word Key From Address instruction. The new Program Status Word key can be used in a subsequent D segment while being updated in the W segment.

In computer systems, a system control program is responsible for resource management and often uses architectural registers. Computer systems under control of the control program operate in User State and in Control State. In User State, user programs and vendor-provided operating systems execute. IBM system control programs run in User State. Certain instructions and facilities of User State may be emulated by Control State software.

Control State is for controlling system resources and they may be shared by multiple domains and provide emulation when necessary. Emulation may be used for enhancing the IBM ESA/390 architecture or may be used so that User State programs that run on one manufacturer's machines having one set of hardware may run on another manufacturer's machines with different hardware. Control State operation is based on the IBM ESA/390 architecture. Entry to Control State from User State is vectored, invoked by Control Interceptions that require assistance by Control State software.

Transitions from User State to Control State occur under a number of conditions. For example, a transition may occur when an instruction occurs that is defined as an emulated instruction when an instruction occurs for which a specific interception control is set, when an interruption occurs for which a specific interception control is set, when an interruption occurs that is defined as a mandatory Control Interception.

The system control program in some environments operates the machine hardware and multiplexes the physical resources of the computing system into multiple logical entities called virtual machines, each of which is a simulation of a computer dedicated to the servicing of a single user or (in the case of a server) a single application. Virtual machines are software entities that can be easily configured to running a particular program rather than to a user. A virtual machine configured in this manner is referred to as a virtual machine server. By virtualizing, operating systems can link guest systems together without the need for guest specific actual hardware. Also, operating systems allow multiple guest systems to share devices and other resources to simplify configuration and maintenance.

Resource management (system control program) and user management (Conversational Monitor System) are separate. When a Conversational Monitor System) user logs on to the system, the system control program creates a virtual machine for that user that includes, among other things, storage address space. An address space is a sequence of addresses that starts at one address and extends up to a value that varies according to size. Storage management is an important task of the supervisor or host which must create, share, and otherwise manage address spaces, gain and relinquish access to an address spaces, and map data on external devices.

Virtual machines running in the ESA/390 architecture have at least one address space, the primary address space, given to the user by the system control program when the user logs on to the system. The size of this address space is determined from the entry describing that user in the user directory, or from a subsequent DEFINE STORAGE command. After logging on, if authorized in the user directory, a user may create other address spaces and share them with other logged on users.

Interpretive Execution

The IBM Interpretive Execution Facility allows a computer system running under a host System Control Program to interpret a virtual machine called the guest. The term "host" refers to the real machine together with the system control program running on the real machine. The host manages real machine resources and provide services to the guest programs which execute in an interpreted machine. The interpreted and host machines execute guest and host programs, respectively. For a transfer of control from a guest virtual machine back to its host System Control Program, an "interception" occurs.

In the existing computer architecture, when a guest issues a START INTERPRETIVE EXECUTION instruction, the instruction is intercepted and emulated by the host program at a significant performance cost. Through emulation, the host provides the functions of a selected architecture which may be available on some other real machine or which may be available only in the virtual machine environment. Privileged and problem program instruction execution, address translation, interruption handling, timing and other functions are interpreted so that those functions are executed in the context of the virtual machine. With the addition of special purpose hardware, interpreted execution can approach speeds that are comparable to native mode execution, that is, execution by a non interpretive version of the architecture.

In the virtual machine environment, the guest program has access to all the functions defined for the designated architecture either through an interpretive execution facility or by the host system control program. For VM/ESA, the control program provides functions through simulation. Simulation generally executes guest functions transparently so that the guest program is unaware as to whether a function is performed by the machine or the host except that simulation usually requires more time.

When an Start Interpretive Execution instruction is executed, the operand of the Start Interpretive Execution instruction containing the State Description is fetched to obtain information about the current state of the guest. When execution of Start Interpretive Execution ends, information representing the state of the guest, including the guest program status word, is saved in the state description before control is returned to the host. The information in the state description, as used and modified by the host during simulation, allows the guest to start and stop execution with valid information. The state description also determines the mode and other environmental conditions in which the guest is to execute.

While in interpretive execution mode the host, in order to be protected from interference by guests or interference among guests, allocates portions of the real machine resources to the virtual machine. Guest storage is confined to a portion of host real storage or to host virtual address spaces controlled by the host system. Host enabled and disabled states generally are undisturbed by execution of the guest. A complete and logically separate set of control registers is maintained by the machine for use by the host and another set for each guest is maintained for use by the guest. Other registers are shared between the host and guests.

In some cases, the host intercepts operations normally performed by the machine. The state description includes control bits which are set by the host to cause intercept operations under specific conditions. When the specific condition are met, the machine returns control to host simulation. Intervention controls capture the introduction of an enabled state into the Program Status Word, so that the host can present an interruption which it holds pending for the guest. Intervention controls may be set asynchronously by the host on another real processor while interpretation proceeds. The machine periodically refetches the controls from storage, so that updated values will be recognized. Guest interruptions can thereby be made pending without prematurely disturbing interpretation.

Guest Storage

Preferred storage mode and pageable storage mode are provided for in the interpretive execution architecture. In preferred storage mode, a contiguous block of host absolute storage is assigned to the guest and in pageable storage mode, dynamic address translation at the host level is used to map guest main storage. In the preferred storage mode, the lower addresses of the machine storage are dedicated to the guest and only one guest can obtain production mode performance.

Multiple High performance Guests

The Multiple Domain Facility TM available on Amdahl computers provided concurrent execution of two or more operating systems with high performance on a single shared central computing complex. Such operation permits the reassignment of resources dynamically with minimal performance penalty for a variety of different architectures or systems.

Error Handling

Error recovery is important to computer system operation Error handling in prior art computer systems has typically followed the process described below:
1. The error is detected by conventional checking logic and an Error History Latch is set.
2. Some small number of clock cycles later, system clocks are turned off and error recovery software is invoked.
3. Recovery software, based on history information provided by the hardware, attempts to recover from the error.
4. If recovery is successful, processing continues.

Historically, error recovery software has been complex and difficult to test and validate. One of the leading causes of this problem has been the need for recovery software to issue multiple system clocks as part of its recovery actions.

In prior art systems, if an error occurred in many situations, a machine check resulted and the entire computer system was checkstopped resulting in significant reduction in the performance of the computer system. The more complex that computers become, the more severe becomes the impact of check stopping the computer.

Historically, error recovery software has been complex and difficult to test and validate. One of the causes of this problem has been the need for recovery software to issue multiple system clocks as part of its recovery actions. Accordingly, there is a need for a computer system having improved error recovery and handling.

SUMMARY OF THE INVENTION

The present invention is a computer system having a number of circuits and error detection circuitry for detecting errors in the circuits and providing error signals. Error recovery is provided as follows:

1. The error is detected by conventional checking logic.
2. System clocks are turned off and error recovery software is invoked.
3. Recovery software attempts to recover from the error. When a need to invoke a recovery action exists, an appropriate action latch is set.
4. When recovery software completes and system clocks are turned on, the action latch forces the hardware to take recovery action.
5. When the recovery action is completed, the action latch is reset and processing continues normally.

Action latches can be used extensively throughout the computer system. For example, in the instruction unit action latches are used for the following purposes:

a. Interrupts: For certain related interrupts, such as malfunction alert, domain damage, and external damage, the interrupt is generated through the use of an action latch. The action latch is cleared when the appropriate interrupt is taken.

Entry: When appropriate, recovery software can force the CPU to enter check stop state when system clocks are turned on. This action latch is reset on entry to check stop state.

c. Timer Facility Recovery: When recovery software detects that a free running timer register (e.g., the Time Of Day clock) is damaged, an action latch can be set that will set the appropriate register's {E-bit} Error bit, effectively marking it as damaged, when clocks resume. p1 d. Instruction Retry: When appropriate, recovery software can set an action latch that will mark a certain instruction unit pipeline state (e.g., A state) to be damaged. When the algorithm flow in that state completes an instruction retry will be forced.

BRIEF DESCRIPTION OF THE DRAWINGS

FIG. 1 depicts an overall block diagram of a computer system incorporating invention.

FIG's. 2, 3 and 4 depict detailed block diagrams of the FIG. 1 system.

FIG's. 5A and 5B depict a block diagram of the Instruction Fetch data and control circuitry that forms part of the FIG. 1 system.

FIG. 6 depicts a detailed block diagram of the register array complex.

Figure 7:
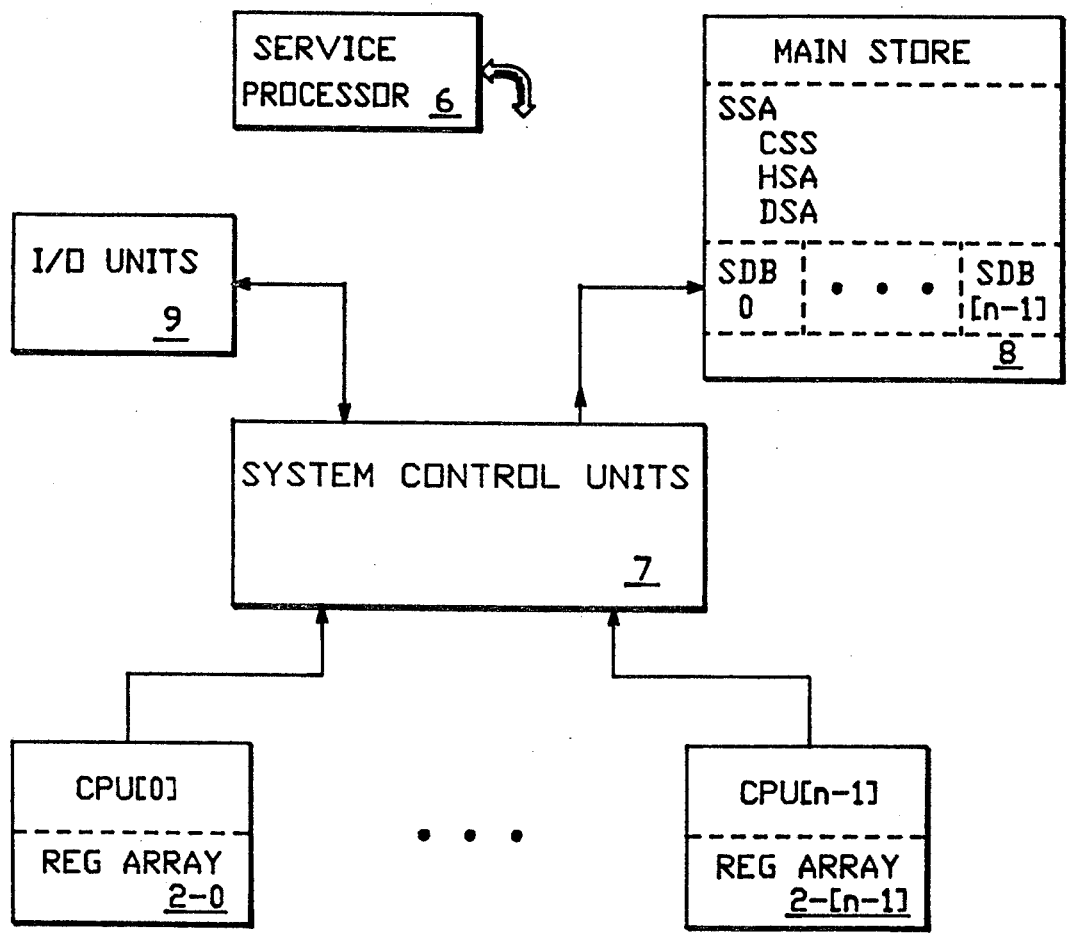

FIG. 7 depicts a block diagram of a multiple CPU system using multiple CPU's of the FIG.1 type.

DESCRIPTION OF THE PREFERRED EMBODIMENTS

Overall Computer System FIG. 1

In FIG. 1, a computer system compatible with the Amdahl 5995-A computer operating in accordance with the ESA/390 architecture is shown. The computer system of FIG. 1 includes an instruction unit 5, a storage unit 4, an execution unit 13, system control units 7, I/0 units 9, main store 8, and a service processor 6. The instruction unit 5 includes an operand address unit 11, an instruction data register 10, an Instruction fetch unit 14, a register array 17, and an instruction unit control 3. The storage unit 4 includes an storage unit Operand Pipe 12 and an storage unit Instruction Fetch Pipe 15.

The FIG. 1 system features two machine states, User State and Control State. In User State, supersets of the IBM ESA/390 architecture are supported. Some User State operations may be emulated by Control State software. The architecture provides support for Control State Software to implement the Multiple Domain Facility TM which provides for multiple computing systems to exist in User State on one processor complex. This operation is accomplished by providing each virtual computing system (domain) with its own private main storage, channels, operator console, and optionally expanded storage, while multiplexing all domains on the CPU resources available to the processor complex.

A "Domain" is a set of resources such as CPU's, main storage and channels available to a User State control program. A domain program is a User State program. A domain consists of both domain-native and guest resources. The terms "User", "User State", and "Logical Processor" also refer to both domain-native and guest resources, although Logical Processor usually is used to refer to a domain CPU.

A "Guest" is a resource that requires the presence of a supporting 'host' domain control program. A guest program is one that runs in an environment consisting of a specific set of guest resources. When a CPU operates in guest mode (User State or Control State), domain resources accessed by a program are guest resources (for example, guest Program Status Word by default. In Control State, access to other resources is under program control which is sometimes called interpretive-execution mode. Domain Mode Control <A> indicates whether a CPU operates in guest mode or not.

A "Domain-native" is a resource that does not require the presence of a domain control program. A domain-native program is one that runs in an environment consisting of domain-native resources. A CPU is in domain-native mode if it is not in guest mode; in this mode, domain resources accessed by a program are domain-native resources (for example, domain-native Program Status Word) by default. In Control State, access to other resources is under program control.

A "Host" is a domain program that supports guest resources. The term "host" is meaningful when discussed in the context of a guest. Host resources may behave differently when the CPU is in guest mode. The term "host mode" may sometimes be used interchangeably with "domain-native" mode.

User programs and vendor-provided operating systems run in User State. IBM system control programs run in User State. User State may be in either System/370 or ESA/390 mode. Certain instructions and facilities of User state may be emulated by Control State software.

Control State is for controlling system resources and they may be shared by multiple domains and may provide emulation. Emulation is often used for enhancing the IBM ESA/390 architecture or for enabling User State programs that run on one manufacturer's machines to run on another manufacturer's machines. Control State operation is based on the IBM ESA/390 architecture. Entry to Control State from User State is vectored, invoked by Control Interceptions that require assistance by Control State software.

Transitions between User State and Control State occur under a number of conditions. For example, transitions occur when an instruction occurs that is defined as an emulated instruction, when an instruction occurs for which a specific interception control is set, when an interruption occurs for which a specific interception control is set, and when an interruption occurs that is defined as a mandatory Control Interception.

In the FIG. 1 system, there are two types of units of operation, the domain unit of operation and the machine unit of operation.

In the FIG. 1 system, the System Communication Interface provides a means of communication among Control State software and various processing units within a system. These processing units include I/O Processors, service processors, and CPUs. The means of communication is through passing data in control blocks in the Hardware System Area, and informing the recipient via a signaling mechanism.

In FIG. 1, the service processor 6 is provided to assist in configuration of the system, machine check handling, operator facilities, and other model-dependent functions.

The FIG. 1 system includes a facility to permit asynchronous communication between tightly coupled multiprocessors using messages. The message processing facility and the instructions to support them are collectively known as the tightly coupled multiprocessor unification facility. Tightly coupled multiprocessor unification facility is distinguished from a local area network. The tightly coupled multiprocessor unification facility assembles large single system images by linking tightly coupled multiprocessors. The resulting complexes are used for transaction processing in large enterprises.

In the FIG. 1 system, the architectural register sets are defined as follows: access registers, floating point registers, general registers, Control State and domain access register MAP registers, register array, and vector registers. Other individual registers, such as the program status word, are also defined.

Using the general register as an example, the following notation is used to identify subsets of a register set. To specify register x of the set of general registers, the notation GRx is used if x is a number; the notation GR(x) is used if x is a variable (for example, GR(R1) means the general register designated by the R1 operand).

To specify the consecutive bit positions beginning with w and ending with z, the notation <w:z> is used. A string of bits is specified by listing the bits, separated by commas as in <x, w:z, ... >. To specify bit string y of register x of the set of general registers, the notation GRx<y> or GR(x)<y> is used. Bit string y may consist of only 1 bit. To specify bit string y within field F of register x of the set of general registers, the notation GRx.F<y> or GR(x).F<y> is used. Bit string y may consist of only 1 bit. Bit positions given for y are with respect to the field F (for example, DAC.DABR_ctl<0>&).

In the FIG. 1 system, the various ones of the architectural registers are implemented in a register array. The registers in the register array are set forth in the following TABLE 1.

TABLE 1

| REGISTER ARRAY NOs. | CPU Register Array |
|---|---|
| 0X | Control State General Registers |
| 1X | Control State Parameters |
| 2X | Domain Access Control/Control Intercept Parameters/Control State Vector Base Pointer Array |
| 3X | Control State access register MAP Registers |
| 4X | Domain Native General Registers |
| 5X | Domain Counters/Domain Parameters |
| 6X | Domain Parameters/Domain Vector Base Pointer Array |
| 7X | Domain access register MAP Registers |
| 8X | Domain Native Control Registers |
| 9X | Domain Parameters |
| AX | Access Registers |
| BX | Access Registers |
| CX | Guest Control Registers |
| DX | Guest Parameters |
| EX | Guest Parameters |
| FX | Reserved for Control State Software |

In FIG. 1, the main Store 8 contains a system storage area where Control State software and the Hardware Systems Area reside, and domain storage area(s), one for each domain. Each storage area is a separate address space, or address dimension, that is, for example, up to 2 GB in size. Mapping of these address spaces to physical main storage is via blocks of storage that are 2 MB or larger.

"Expanded Storage" Control State software and domains may each optionally have its own expanded storage. Mapping of Control State or domain expanded storage areas to physical expanded storage is similar to main storage mapping.

"Shared Global Storage" The architecture can support a large single system image that is composed of multiple tightly coupled (i.e., shared main memory) multiprocessors. Shared global storage permits data to be shared between tightly coupled multiprocessors by functionally connecting the shared global storage to the main storage of each of the tightly coupled multiprocessors. A domain in a tightly coupled multiprocessor can share all or a portion of shared global storage with a domain in another tightly coupled multiprocessor. Mapping of domain shared global storage to physical shared global storage is similar to the expanded storage and main storage mapping.

In the FIG. 1 system, the register array Complex 17 includes 256 word registers that are under control of Control State instructions. A specific register array register is identified by an 8-bit operand field in these instructions. Defined register array registers have two identifications: the functional name (for example GR0) and their register offset in the register array (for example RA(C0)). In addition to using one of the register array manipulation instructions, some register array registers can be accessed directly by unique instructions that manipulate the functional registers (for example domain control registers can be loaded using the Load Control instruction). For such registers, there may be a preference in the means of access. For example, loading the register array copy of the system prefix has no effect on prefixing; the Set Prefix instruction should be used. Note that the register array registers are not necessarily changed by an instruction addressing the register; some (for example the User State Old Program Status Words can be changed due to an interruption or control interrupt. The register array contains most architecturally defined registers and controls, including Control State prefix, domain-native prefix, guest prefix, domain access control, feature control bits, general and control registers.

The architectural registers that are not in the same physical register array are listed as follows:

The Control State Program Status Word is not in the register array. The host Program Status Word to be saved in the interpretive-execution mode is also not maintained in the register array; it is saved in the Logical Processor State Descriptor. (Note that although the domain-native and guest Program Status Words are provided in the register array for Control State Software to inspect and modify, the instruction-address field (bits 33:63) is invalid).

The host general registers 14 and 15 defined to be saved in the interpretive-execution mode are not maintained in the register array; they are saved in the Logical Processor State Descriptor. (Note that the User State and Control State general registers are in the register array.

There is one set of floating point registers provided in User State, and they are not contained in the register array.

In FIG. 1, main storage 8 contains (1) a system storage area where Control State Software (both instructions and data) resides and where the Hardware System Area resides, and (2) domain storage areas, one for each domain. Mapping of these address spaces to physical main storage is via blocks of storage that are, for example, 2 MB or larger. A domain's storage area is accessed using domain addresses. In User State, addresses are domain addresses of the current domain. In Control State, CPU generated addresses are generally system addresses. However, under the control of the Domain Access Controls register, some operand effective addresses treated as domain addresses.

In Control State, Control State Software can select either User Program Status Word <AS> and Program Status Word <T> to determine the mode of accessing main storage, or it may choose to use another set of three bits to determine the mode of accessing main storage, which can be different from the current one, as specified by the user Program Status Word.

Detailed System FIG's. 2, 3, 4

In FIG's. 2, 3 and 4, further details of the computer system of FIG. 1 are shown with an orientation as depicted in the lower right hand corner of FIG. 1. The computer system operates in a pipelining fashion where operation is divided into a number of segments including P, A, T, B, R segments and D, A, T, B, X, and W segments. The units of FIG's. 2, 3, and 4 operate generally over the D, A, T, B, X, and W segments after a current instruction is loaded into the instruction data register 65. To load an instruction, the P segment performs priority resolution, the A segment performs instruction address presentation, the T segment performs Translation Look Aside Buffer lookup and cache tag matching, and the B segment loads the current instruction into the instruction data register 65.

Figure 2:
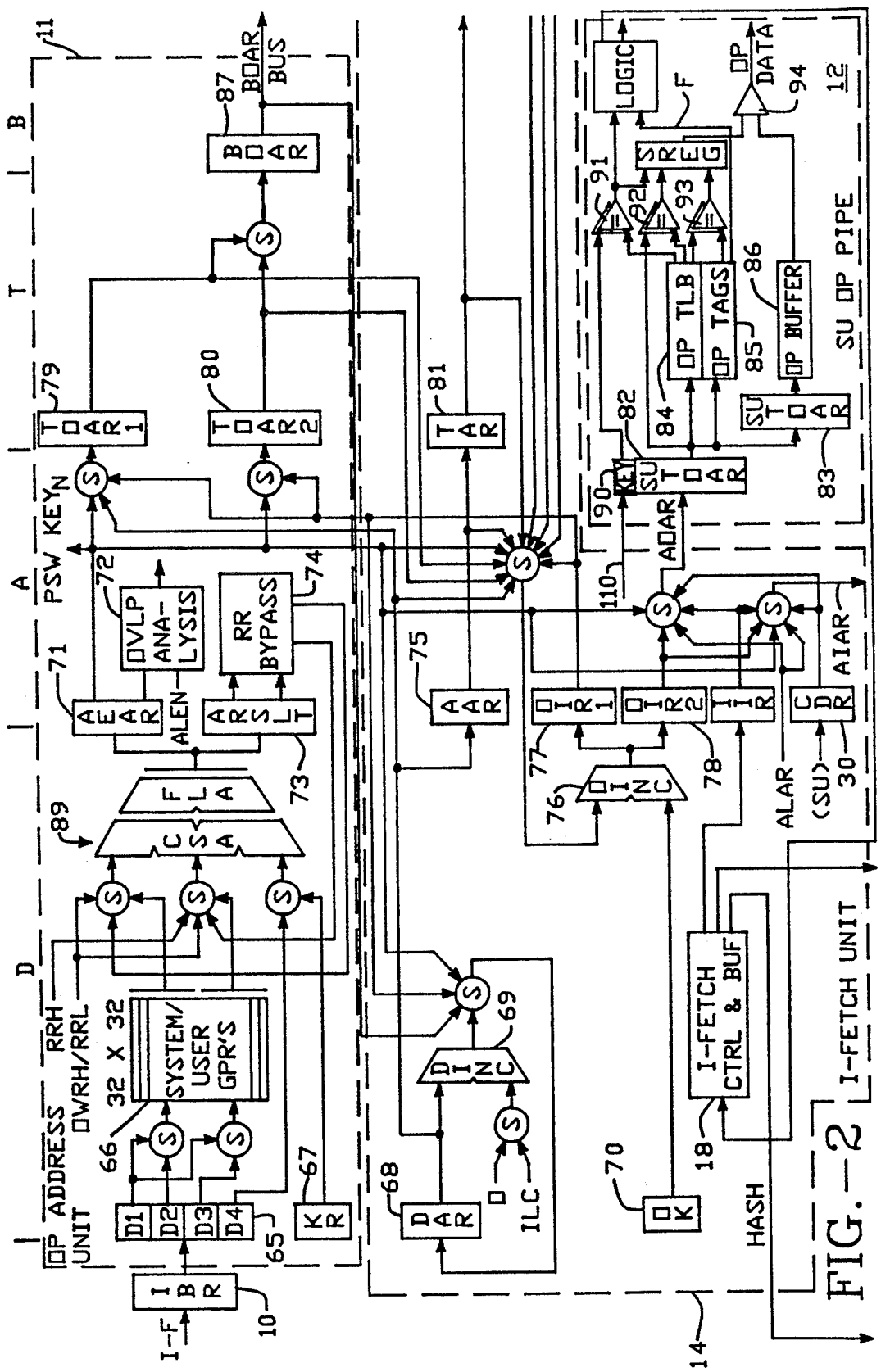

In FIG. 2, the instruction unit 5 fetches instructions into the instruction data register 65 which are to be processed in a pipeline fashion. Up to six instructions, for example instruction $I_1$, $I_2$, $I_3$, $I_4$, $I_5$, and $I_6$ can be processing in the FIG's. 2, 3, and 4 units in the D, A, T, B, X, and W segments.

In FIG. 2, the Instruction fetch unit 14 fetches instructions and stores them into the instruction data register 65 and delivers them to the storage unit Operand Pipe 12 and the storage unit Instruction fetch pipe 15 to maintain a flow of instructions to be executed. The units of FIG. 2 cooperate with the register array 17 for controlling the flow of instructions and operands in the pipeline execution of the computer system.

The Instruction fetch unit 14 pre fetches each instruction into the instruction data register 65 so that when the D segment commences, the Instruction fetch unit 14 has finished for the current instruction, for example instruction $I_1$, and is pre fetching subsequent instructions for example instructions $I_2$, $I_3$, $I_4$, $I_5$, $I_6$ and $I_7$. The Instruction fetch unit 14 during prefetching interacts with the storage unit 4 during the P, A, T, B, R segments that all precede the D, A, T, B, X, and W segments.

In FIG. 2, the instruction data register 65 provides information to the operand address unit 11. The operand address unit 11 determines addresses information to be processed by instructions. The addresses of operands are passed to the storage unit of operand pipe 12 which fetches the operands which are to be operated upon and delivers them to the execution unit 13. The execution unit 13 performs arithmetic and logical functions on the operands such as add, multiply, divide, move, or, and shift.

After prefetching, the D segment is the decode cycle for instruction decoding of the instruction in instruction data register 65.

The A segment is address presentation for the storage unit 4. The T segment is a Translation Look Aside Buffer lookup and cache tag match cycle. The Translation Look Aside Buffer is a translation look aside buffer. The B segment is the buffer cycle when, if a correct translation occurred in the Translation Look Aside Buffer and if the line of data addressed is in the cache, the data is accessed and latched into the operand word register (46, 49, 52). The X segment is for execution in the execution unit 13 which takes data from the operand word register, executes on the data and places the result in the result register (48, 51, 54). The W segment is for writing the results to the location specified by the instruction, for example, to an internal register in register array 17 or back to main storage 8.

Referring to FIG.'s 2, 3, and 4 the instruction buffer register 65 is loaded by the Instruction fetch unit 14. The instruction buffer register 10 in turn loads the instruction data register 65 in four fields, D1, D2, D3 and D4. The contents of the register 65 are selected to read the system or user general purpose registers 66. The contents of the general purpose registers are selected into the three input adder 89.

After the Set Program Status Word Key From Address instruction is latched into the instruction data register 65, the data address in the DAR register 68, valid in the D segment, is staged through the address registers in the A, T, B, X and W segments using the registers DAR 68, AAR 75, TAR 81, BAR 43, XAR 44, and WAR 45, respectively. In one alternate embodiment, the registers AAR 75, TAR 81, BAR 43 are eliminated and the equivalent information is obtained from other registers. Conceptually, however, these registers still exist even in the alternate embodiment.

Following the ESA/390 architecture, an operand storage address consists of three components, a base, an index and a displacement. The base, index and displacement values from general purpose registers 66 are added in adder 89 to form the effective address which is latched into the A segment result register 73 and/or the A segment effective address registers 71 and/or AREA registers 73 and 71]. The adder 89 forms the effective address and it is placed into the A segment effective address register 71 and into the A segment result register 73. The contents of the effective address register 71 are present in the A segment and are used, among other things, as part of the access to the storage unit operand pipe 12 to obtain an operand from the storage unit. The contents are also stored into the T operand address registers 1 and 2, TOAR1 79 and TOAR2 80 in the T segment. The contents of one of the registers 79 or 80 are passed to the B segment operand address registers, BOAR 87. The storage unit Operand pipe 12 includes a register 90 which is loaded with the Program Status Word Key which is to be used for key protection checking when the storage unit is accessed. The key from the register 90 is compared in comparator 91 with a key from the Operand Translation Look Aside Buffer unit 84 to determine if a key match exits. The other portions of the Translation Look Aside Buffer including the Operand Tags 85 and Operand buffer 86 are also compared in comparator 92 to generate a Translation Look Aside Buffer MATCH signal. If the key match from comparator 91 is not asserted, meaning that the key from register 91 does not match the key from the Translation Look Aside Buffer unit, then the Translation Look Aside Buffer match signal is not asserted meaning that a protection key violation has occurred. If the keys do match and all the other required matches are present, the Translation Look Aside Buffer match signal is asserted indicating that, among other things, no key protection violation has occurred.

If the instruction being processed is a Set Program Status Word Key From Address instruction, for example, then the processing during the X segment will cause a new Program Status Word including a new Program Status Word Key$_N$ to be stored through the result registers 48, 51 and 54 to the register array complex 17. The Program Status Word will be loaded directly into the register array 56 and also will be stored into the Program Status Word Key shadow register 95. The Program Status Word register 95 holds a duplicate copy of Program Status Word Key stored in the register array 56.

Once the D cycle of a Set Program Status Word Key From Address instruction is complete, the effective address latched in the A segment effective address register 71 will be moved down the pipeline to provide a new Program Status Word in the W segment provided nothing prevents the new Program Status Word from being written.

Figure 5A:
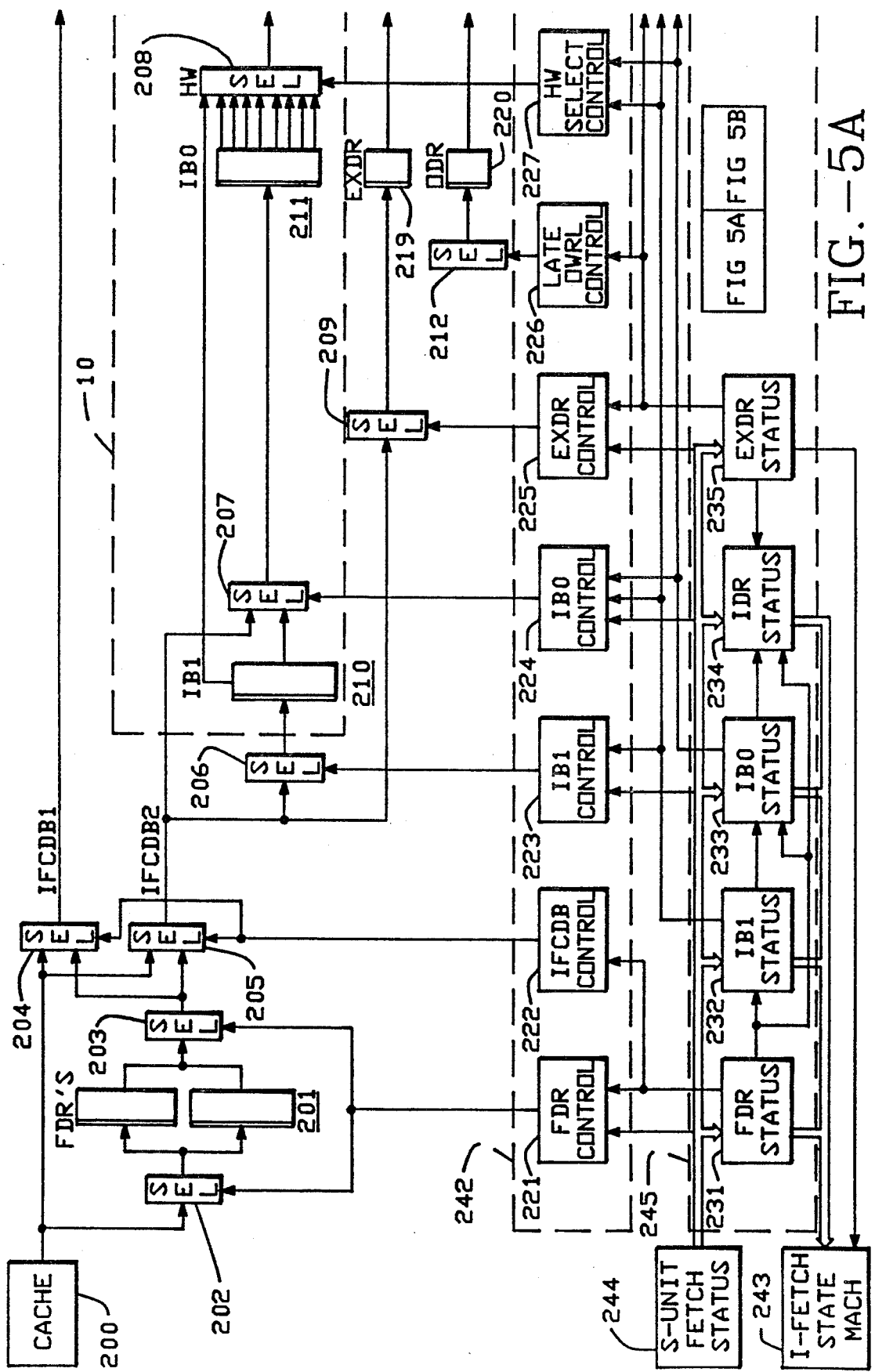

Instruction Fetch Platform FIG. 5

In FIG. 5, further details of the Instruction Fetch Unit 14 of FIG. 1 are shown. In FIG. 5, the instruction data register 65 of FIG. 2 is expanded and is shown together with the circuitry for loading the instruction data register 65 with a sequence of instructions such as shown in TABLE A above.

In FIG. 5, the instruction data register 65 is loaded from the storage unit cache 200 or the Fetch Data Register's 201. Selection of instructions into the Fetch Data Register's 201 is under control of the selector 202 which in turn is controlled by the Fetch Data Register control 221. Selection of instructions from the cache 200 or the Fetch Data Register's 201 is under control of the selection gates 204 and 205 which in turn are controlled by the I segment Fetch Control Data Buffer control 222. Selection of instructions from the Fetch Data Register's 201 is under control of the selection gate 203 which in turn is controlled by the Fetch Data Register control 221. Selection gate 206 controls selection of the selected output of selector 205 into the Instruction Buffer 1 register 210. Selector 206 is under the control of the Instruction Buffer 1 control 223. The selection from the instruction buffer 1 register or from the selector 205 is under control of the selector 207 which in turn is controlled by the Instruction Buffer 0 control 224. The selected instruction selected by selector 207 is latched in the instruction buffer 0 register 211. Selection of the contents of the Instruction Buffer 0 register 211 by selector 208 is under control of the Hardware select control 227 and selector 208 in turn feeds the selector 213 which is under control of the I segment Fetch Data Buffer control 228. The output from selector 213 or from the cache through selector 204 is under control of selector 214 which in turn is controlled by the instruction data register select control 229. The selected instruction from selector 214 is input to the instruction data register 65 which is staged through the instruction data register 65 stages IDR, AIDR, TIDR, BIDR, XIDR, WIDR, and ZIDR labeled 65-1, 65-2, 65-3, 65-4, 65-5, 5-6 and 65-7, respectively. The output form the ZIDR stage of the instruction data register 65 is selected by the selectors 237 and 238 is the DBUS of the Operand Address Unit of FIG. 2.

In FIG. 5, a decoder 270 decodes the instruction length count from the instruction in the D segment instruction data register. The instruction length count is latched into the A segment instruction length count register 271 and staged to the T segment instruction length count register 272 for the T segment. The T segment instruction length count is added in adder 273 to the contents of the B segment next sequential instruction address register 275 to form the next sequential instruction address which is stored back into the B segment next sequential instruction address register 275. When a branch or other condition indicates that the next instruction in the sequence determined by adding the instruction length count to the current instruction is not the next instruction, the B segment next sequential instruction address register is loaded directly from the B segment operand address register 87 of FIG. 2 under control of selector 274. The B segment next sequential instruction address is determined one instruction flow ahead of the current instruction in the pipeline. The B segment next sequential instruction address in the B segment next sequential instruction address register is a predicted value based on instruction length count.

In FIG. 5, control of the selection of which instructions to feed into the instruction data register 65 is under the selection controls 221 through 229 in control unit 242. These controls receive status information from status unit 245 which is loaded by the storage unit Fetch Status 244. Status unit 245 also provides status to the Instruction Fetch state machine 243. The storage unit Fetch Status 244 loads the Fetch Data Register status 231, Instruction Buffer 1 status 232, Instruction Buffer 0 status 233, instruction data register status 234, exception data register status 235 and the Bubble Up Status 236 in the status unit 245. The different status and control conditions and related circuits for a main frame computer are extensive, and many of the details related thereto are not relevant to the present invention, but such details can be found, for example, in the Amdahl 5995-A computers. The particular control and status conditions which are relevant for selecting instructions in connection with the present invention will be described in detail hereinafter.

Register Array Complex FIG. 6

Figure 3:
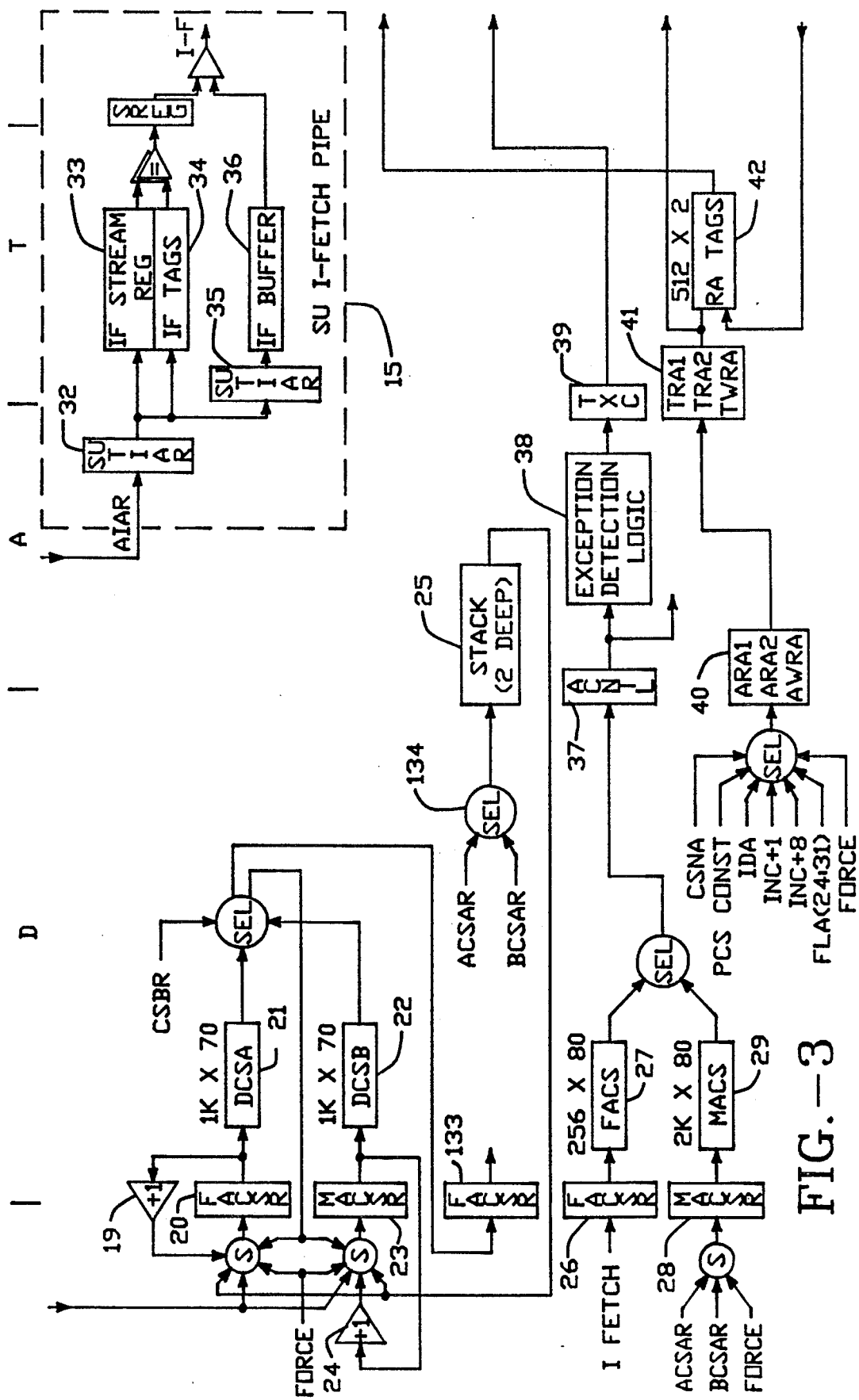
Figure 4:
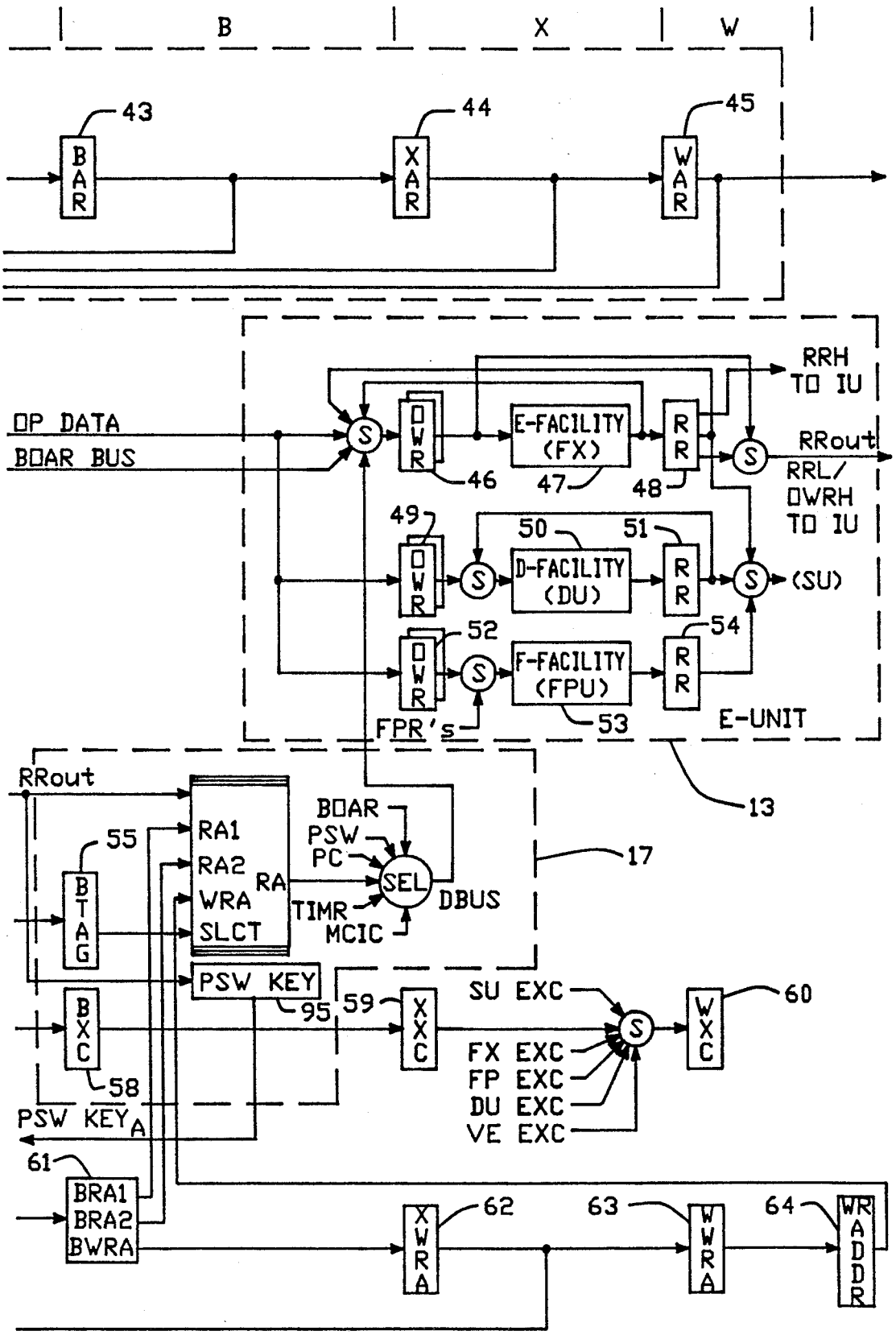

In FIG. 6, further details of the register array complex 17 of FIG. 1 are shown. The complex includes registers 293, Program Status Word register 280, RAM complex 281, timer register 291, and copy register 292. In FIG. 6, the RAM complex 281 is like that shown in the above identified cross referenced application entitled MEMORY HAVING CONCURRENT READ AND WRITING FROM DIFFERENT ADDRESSES. The Program Status Word register 280, the TIMER register 291, and the copy register 292 use the same data in lines DI_H and DI_L which are the RRH and RRL lines, RRout, from the result register. Similarly, the read address lines RA_1 and RA_2, the write address lines WRA, the even and odd write strobes WR_EVE and WR_ODD, and the control lines CTRL are as shown in the cross referenced application. The selectors 282 and 283 are like the selectors 24 and 25 in FIG. 3 of the cross referenced application with the addition of the Program Status Word inputs.

The RAM complex 17 can concurrently read and write to different addresses. As described in the cross referenced application, the RAM complex includes two RAMs, each with an address selector. The RAM complex includes a data out multiplexer for selecting outputs from one of the RAM's. The RAM complex includes a tag array storing an array of tag bits, one for each address in the RAM's. The tag bits are used to control the address selectors and multiplexer.

A single bit tag is provided in the tag array for each entry in the RAM's. The tag marks which one of the two RAM's has the valid data for the corresponding specific address tag. During a RAM read cycle, the tag routes the read address through the address selector for the correct one of the RAM's. The correct RAM is read using the read address and a staged copy of the tag controls the data out selector to select data from the correct RAM for the data out bus.

During a concurrent read and write cycle, the tag selects the read addresses for one RAM and selects the write address for the other RAM. A write enable signal, is provided for the write RAM. The tag for the write address is then updated in the tag array to point to the write RAM.

With the ability to read and write concurrently to different addresses, enhanced performance results by using only a single operation to concurrently read and write to the same address in the RAM complex.

Multiple CPU System FIG. 7

In FIG. 7, a multiple CPU embodiment of the FIG. 1 system is shown. The FIG. 7 system includes a service processor 6, I/O Unit 9, a main store 8, system control unit 7 and a plurality of CPU's including CPU(0), ..., CPU(n−1). Each of the CPU's includes a register array including the register arrays RA(0), ..., RA(n−1). The register arrays in each of the CPU's of FIG. 7 are like the register array complex 17 of FIG. 1 and of FIG. 6.

Each register array RA(0), ..., RA(n−1) in the CPU's of FIG. 7 includes 256 word registers that are under control of Control State instructions. A specific register array register is identified by an 8-bit operand field in these instructions. Defined register array registers have two identifications: the functional name (for example GR0) and their register offset in the register array (for example RA(C0)). In addition to using one of the register array manipulation instructions, some register array registers can be accessed directly by unique instructions that manipulate the functional registers (for example domain control registers can be loaded using the Load Control instruction). For such registers, there may be a preference in the means of access. For example, loading the register array copy of the system prefix has no effect on prefixing; the Set Prefix instruction should be used. Note that the register array registers are not necessarily changed by an instruction addressing the register; some (for example the User State Old Program Status Words can be changed due to an interruption or Control Interception. Each register array contains architecturally-defined registers and controls, including Control State prefix, domain-native prefix, guest prefix, domain access control, feature control bits, general and control registers.

The Control State Program Status Word is store in the Program Status Word register in the register array complex as described in connection with FIG. 6. The host Program Status Word to be saved in the interpretive execution mode is saved in the storage data block of main store 8. The host general registers 14 and 15 defined to be saved in the interpretive execution mode are also saved in the storage data block. The User State and Control State general registers are in the register array.

In main storage 8, the system storage area stores the Control State Software (both instructions and data) and the Hardware System Area, and (2) domain storage areas, one for each domain. Mapping of these address spaces to physical main storage is via blocks of storage and a domain's storage area is accessed using domain addresses. In User State, addresses are domain addresses of the current domain. In Control State, CPU generated addresses are generally system addresses. However, under the control of the Domain Access Controls register, some operand effective addresses are treated as domain addresses.

In Control State, Control State Software can select either User Program Status Word <AS> and Program Status Word <T> to determine the mode of accessing main storage or use another set of three bits to determine the mode of accessing main storage, which can be different from the current one, as specified by the user Program Status Word.

The FIG. 1 system includes a machine unit of operation that is used to time executions in the system. The computer system operates with a User State and a Control State and has multiple domains for logical processors. In addition to the machine unit of operation, a Domain Unit of Operation is provided to time domain operations in the system. The domain unit of operation is used for emulating User instructions as described in the cross referenced application.

Module Function Definition

RMCCSEX

The Control State exigent machine check handler is changed to invoke RMCTIMER if the Timer Source bit is set with a Processing Damage machine check.

RMCUSEX

The User State exigent machine check handler is changed to invoke RMCTIMER if the Timer Source bit is set with a Processing Damage machine check.

Operation

Timer error recovery is invoked from both the exigent machine check and repressible machine check error environments. In the exigent case, a Processing Damage condition results with the Timer Source set in the Machine Check Interrupt Code. This results from a timer instruction being issued to a broken timer. The exigent machine check handlers, RMCCSEX and RMCUSEX, are the modules that are sensitive to this. If they detect that a timer is the source of the Processing Damage then RMCTIMER will be invoked to take whatever repair action is possible, set damage flags if hard broken and generate domain mode Timer Facility Damages if appropriate. The overall impact of the exigent is the same as in the non timer source condition, it depends on the state of the machine. If from User State, then it will be reflected. If from domain unit of operation and there is no MCPOINT interception, then the effect is the same, either a Processing Damage (for instruction emulation) or an System Damage (for interrupt emulation) will be reflected. If from non domain unit of operation control state, only if the Logical Processor Dispatcher was current and the the Logical Processor Dispatcher was current and the Logical Processor context in the Logical Processor Block is invalid (indicating that the register array context is valid) will a domain machine check be presented. If there is a Timer source, then a Timer Facility Damage will be merged only if a Processing Damage is to be presented to the domain. The actions taken by RMCTIMER are independent of the actions taken by the Exigent Machine Check Control Interrupt handlers. If RMCTIMER generates a Timer Facility Damage for the current Logical Processor and the exigent Control Interrupt handler also has the condition merged with the Processing Damage, the domain will only see a single Timer Facility Damage, in this case merged with the Processing Damage.

Note that in Control State, Set Clock is the only timer instruction that references a control state timer, The Control State Time Of Day. But as this is used to repair the Time Of Day (i.e., reset the Error bit), it will not result in a Processing Damage Machine Check. Thus, the only time that we would see a Processing Damage from a timer instruction in Control State would be if we are accessing a domain timer and this should only be done as part of some emulation. Thus, there is no possibility that we would reflect a machine check inappropriately.

For repressible machine checks, RMCTIMER will be called in all cases. RMCTIMER will perform the initial analysis of the register array timers and then call internal subroutines to handle the particular timers in error. There are also routines that are called to perform functions common to multiple timer errors. These include determining which Logical Processors have affinity to the local CPU and attempting to move an Logical Processor to another CPU.

The analysis of the timer errors has to accommodate the way Timer Facility Damage Machine Checks are generated. Specifically, if any timer is in the soft error state (Error bit on, Inhibit bit off), no new Timer Facility Damage Machine Checks will be generated. However, errors may still be detected. The implications for Macrocode are that while processing a Timer Facility Damage Machine Check and serially checking the timer register arrays, a timer may enter either the soft or hard error states without a new machine check as long as any other timer has an Error bit set. Thus, it is possible to have checked a timer and found no errors and to have it enter the error state before we reset the Error bit of a timer that caused the first machine check. To allow for this possiblity, we have to have an iterative algorithm that will recheck all the timers if any error is detected while traversing the timers. Only when no new error conditions are detected can we be sure that any subsequent error will result in a new machine check.

One source of timer errors is a parity error in the Instruction unit's copy of timer control information. If this occurs, all timers dependent on that information will take an error. There is no mechanism to inform Macrocode that this is the source of the error. So to account for this possibility, on any error condition we will force this information to be reloaded. This control information consists of:

1. Control State Program Status Word
2. Control State CR0
3. Domain Mode Control
4. The Control Intercept Interruption Mask The Control Interrupt resulted in a new Program Status Word and since the other information is contained in register arrays, all that is required is a Store Single Register Array followed by a Load Single Register Array for each of them.

The following sections describe the actions taken in the soft error situation and the hard error situation (i.e., when Inhibit bit first comes on), for each timer. Note that the following assumes the control information has already been reloaded and it will be done once at the start of each scan of the timer register arrays.

Control State CPU Timer

Soft Error Condition

On a soft error, the CPU timer will be reloaded with a recalculated value. This is determined from the current Time Of Day and the time the CPU timer was expected to go off.

a. Access Timer Quene Block Quene.
b. If no Timer Queue Blocks are set, then set CPU Timer to max value.
c. Calculate difference between current Time Of Day and Time Of Day when timer is set to go off.
d. If Timer Queue Block interval has expired, set CPU Timer to 0 to force Timer Control Interrupt as soon as we enable for it.
e. If Timer Queue Block interval not expired, set CPU Timer to new interval value.
f. Check next timer.

Hard Error Condition

In this case, the only action will be to set the damage flag to inform timer services to use alternate algorithms for timing.

a. Set Processor Save Area Extension damage flag for CPU Timer.
   b. Check next timer.

Control State Time Of Day

Soft Error Condition

The basic idea here is to sync the Time Of Day to a value from another CPU. This will be done by the Time Of Day SYNC module (to be written). It is anticipated that the Time Of Day will be sync'd or it will not be, however, there might be the possibility that a new Time Of Day value was obtained from the operator, this is still Timer Facility Damage and part of the Time Of Day sync design. If a new value is obtained, then every domain will need a Timer Facility Damage because the domain epoch difference would now be invalid too. This is being mentioned here only to indicate a further enhancement for the time being we assume either success or failure. If the Time Of Day is not reset back to the exact value it should be, it will be treated as a hard error and processor termination will be forced.

a. Call Time Of Day SYNC module.
   b. If Time Of Day reset correctly then redo time stamps in the Machine Check Block and Machine Check Information Block, then proceed to check next timer.
   c. If Time Of Day is not reset then set flag to force processor termination. Note, as part of processor termination, there will be an attempt to move Logical Processors to another CPU and those that can't be switched will be checkstopped.

Domain Dispatch Timer

Soft Error Condition

On a soft error, the CPU timer will be reloaded with 0. This will force a pending Control Interrupt to occur when it next starts to decrement. Basically, we are forcing the end of a time slice here.

a. Set domain Dispatch Timer to 0.
   b Check next timer.

Hard Error Condition

In this case, we will attempt to vacate the CPU, i.e., switch Logical Processor affinities to other CPUs. However, if not all Logical Processors are moved they will continue to be dispatched on this CPU and we will have to use CPU Timer facilities for time slicing.

a. Set Processor Save Area Extension damage flag for Domain Dispatch Timer.
   b. Invoke Recovery Quiesce.
   c. Call vacate routine, no special action is taken for Logical Processors that aren't reassigned to other CPUs.
   d. Resume from Recovery Quiesce.
   e. Check next timer.

Interval Timer Residue Counter

Soft Error Condition

On a soft error, the Interval Timer Residue Counter will be reloaded with 0. If there was a current Logical Processor, the only impact will be that a few timer ticks are lost and there is no need to reflect an error.

a. Set Interval Timer Residue Counter to 0.
   b. Check next timer.

Hard Error Condition

The loss of this timer only affects Logical Processors if they use the facility, i.e., only 370 guests. However, it is not known if a given domain will use the facility or not so vacate the CPU just in case it does. A domain will be impacted if a domains Logical Processors were in guest mode and not reassigned to other CPUs or if the domain's current Logical Processor was in guest mode. At this time, it is still to be determined exactly what condition is to be reflected to the Host as architecturally this represents an interval timer repressible condition, which is S/370 only, however, the machine check itself will cause a Host interception and interval timer is not defined for ESA (the mode of the Host), thus most likely it has to be reported as a Timer Facility Damage, but we have to confirm this. The residual affect for Logical Processors that still remain on this CPU will be a Processing Damage Machine Check if Start Interpretive Execution is issued. This prevents any further use of the timer.

a. Set Processor Save Area Extension damage flag of the Interval Timer Residue Counter.
   b. Invoke Recovery Quiesce.
   c. Call vacate routine which returns a list of Logical Processors that had affinity for this CPU.
   d. Loop through list of Logical Processors and if the Logical Processor was current and in Guest mode then set up pending Timer Facility Damage and if the Logical Processor was not current, not reassigned and in Guest mode, then set up pending Timer Facility Damage.
   e. Resume from Recovery Quiesce.
   f. Check next timer.

Run Time Accumulator

Soft Error Condition

On a soft error, the Run Time Accumulator will be reloaded with the last known value which presumably will be in a scheduler data area. This will not have an impact on any of the domains and should only minimally impact the scheduler. At this time use of the Run Time Accumulator has not been implemented so it is not clear exactly where the previous known value will be located.

a. Set Run Time Accumulator to last known value.
   b. Check next timer.

Hard Error Condition

In this case, we will just set the damage flag for the Run Time Accumulator. At this time use of the Run Time Accumulator has not been implemented, so it is not clear how this will impact the scheduler, but it will have to be sensitive to the damage flags and forego any use of this timer if so indicated.

a. Set Processor Save Area Extension damage flag for the Run Time Accumulator.
   b. Check next timer.

Domain Native CPU Timer

Soft Error Condition

On a soft error, the Domain Native CPU Timer will be reloaded with 0, mainly to clear the Error bit. If there was a current Logical Processor, then a Timer Facility Damage will be generated for the Logical Processor and it will be up to the Logical Processor to reset to a good value.

a. Set Domain Native CPU Timer to 0.
   b. If there was a current Logical Processor, the set a pending Timer Facility Damage for the Logical Processor.

c. Check next timer.

Hard Error Condition

The loss of this timer affects any Logical Processors with affinity to this CPU, so we will vacate the CPU. A domain will be impacted if the domain's Logical Processors were not reassigned to other CPUs or if the domain has a current Logical Processor, reassigned or not. The residual affect for Logical Processors that still remain on this CPU will be a Processing Damage Machine Check if Set CPU Timer or Store CPU Timer is issued. This prevents any further use of the timer.

a. Set Processor Save Area Extension damage flag for the Domain Native CPU Timer.
b Invoke Recovery Quiesce.
c. Call vacate routine which returns a list of Logical Processors that had affinity for this CPU.
d. Loop through list of Logical Processors and if the Logical Processor was current then set up pending Timer Facility Damage and if the Logical Processor was not current and not reassigned then set up pending Timer Facility Damage.
e. Resume from Recovery Quiesce.
f. Check next timer.

Domain Native Clock Comparator

Soft Error Condition

On a soft error, the Domain Native Clock Comparator will be reloaded with 0, mainly to clear the Error bit. If there was a current Logical Processor, then a Timer Facility Damage will be generated for the Logical Processor and it will be up to the Logical Processor to reset to a good value.

a. Set Domain Native Clock Comparator to 0.
b. If there was a current Logical Processor then set a pending Timer Facility Damage for the Logical Processor.
c. Check next timer.

Hard Error Condition

The loss of this timer affects any Logical Processors with affinity to this CPU, so we will vacate the CPU. A domain will be impacted if the domain's Logical Processors were not reassigned to other CPUs or if the domain has a current Logical Processor, reassigned or not. The residual affect for Logical Processors that still remain on this CPU will be a Processing Damage Machine Check if Set Clock Comparator or Store Clock Comparator is issued. This prevents any further use of the timer.

a. Set Processor Save Area Extension damage flag for the Domain Native Clock Comparator.
b. Invoke Recovery Quiesce.
c. Call vacate routine which returns a list of Logical Processors that had affinity for this CPU.
d. Loop through list of Logical Processors and if the Logical Processor was current then set up pending Timer Facility Damage and if the Logical Processor was not current and not reassigned then set up pending Timer Facility Damage.
e. Resume from Recovery Quiesce.
f. Check next timer.

Domain Native Epoch Difference

Soft Error Condition

On a soft error, if there was a current Logical Processor, then the Domain Native Epoch Difference can be reloaded from the Logical Processor Block (note there is a requirement then that the emulation routine for Set Clock also update the Logical Processor Block copy when it alters the live register array). If no current Logical Processor then set it to 0 to clear Error bit.

a. If from User State or domain unit of operation, then get the current Logical Processor.
b. If from Control State and Logical Processor Dispatcher was current process, then determine if Logical Processor context in register array is valid and consider this as current Logical Processor.

If a current Logical Processor, get the Logical Processor Block copy of Domain Native Epoch Difference and load into register array.

d. If no current Logical Processor, then set Domain Native Epoch Difference to 0.
e. Check next timer.

Hard Error Condition

The loss of this timer affects any Logical Processors with affinity to this CPU, so we will vacate the CPU. A domain will be impacted if the domain's Logical Processors were not reassigned to other CPUs or if the domain has a current Logical Processor, reassigned or not. The residual affect for Logical Processors that still remain on this CPU will be to give a Condition Code=3 on the Macrocode emulation of Set Clock or a Condition Code=2 for Store Clock (done by hardware).

a. Set Processor Save Area Extension damage flag for the Domain Native Epoch Difference.
b. Invoke Recovery Quiesce.
c. Call vacate routine which returns a list of Logical Processors that had affinity for this CPU.
d. Loop through list of Logical Processors and if the Logical Processor was current then set up pending Timer Facility Damage and if the Logical Processor was not current and not reassigned then set up pending Timer Facility Damage.
e. Resume from Recovery Quiesce.
f. Check next timer.

Guest CPU Timer

Soft Error Condition

On a soft error, the Guest CPU Timer will be reloaded with 0. If there was a current Logical Processor in Guest mode, then a Timer Facility Damage will be generated for the Logical Processor.

a. Set Guest CPU Timer to 0.
b. If there was a current Logical Processor in Guest mode, then set a pending Timer Facility Damage for the Logical Processor.
c. Check next timer.

Hard Error Condition

The loss of this timer only affects Logical Processors if they use the facility, i.e., only if Guest mode entered. However, we don't necessarily know if a given domain will use the facility or not, so vacate the CPU just in case it does. A domain be impacted if the domain's Logical Processors were in Guest mode and not reassigned to other CPUs or the domain's current Logical Processor was in guest mode. The residual affect for Logical Processors that still remain on this CPU will be a Processing Damage Machine Check for Start Interpretive Execution or for Set CPU Timer and Store CPU Timer issued in Guest mode. This prevents any further use of the timer.

a. Set Processor Save Area Extension damage flag for the Guest CPU Timer.
b. Invoke Recovery Quiesce.
c. Call vacate routine which returns a list of Logical Processors that had affinity for this CPU.

d. Loop through list of Logical Processors.
e. Resume from Recovery Quiesce.
f. Check next timer.

Guest Clock Comparator

Soft Error Condition

On a soft error, the Guest Clock Comparator will be reloaded with 0. If there was a current Logical Processor in Guest mode, then a Timer Facility Damage will be generated for the Logical Processor.
  a. Set Guest Clock Comparator to 0.
  b. If there was a current Logical Processor in Guest mode, then set a pending Timer Facility Damage for the Logical Processor.
  c. Check next timer.

Hard Error Condition

The loss of this timer only affects Logical Processors if they use the facility, i.e., only if Guest mode entered. However, we don't necessarily know if a given domain will use the facility or not so we will vacate the CPU just in case it does. A domain will be impacted if the domain's Logical Processors were in Guest mode and not reassigned to other CPUs or the domain's current Logical Processor was in guest mode. The residual affect for Logical Processors that still remain on this CPU will be a Processing Damage Machine Check for Start Interpretive Execution or for Set Clock Comparator and Store Clock Comparator issued in Guest mode. This prevents any further use of the timer.
  a. Set Processor Save Area Extension damage flag for the Guest Clock Comparator.
  b. Invoke Recovery Quiesce
  c. Call vacate routine which returns a list of Logical Processors that had affinity for this CPU.
  d. Loop through list of Logical Processors and if the Logical Processor was current and in Guest mode then set up pending Timer Facility Damage and if the Logical Processor was not current, not reassigned and in Guest mode, then set up pending Timer Facility Damage.
  e. Resume from Recovery Quiesce.
  f. Check next timer.

Guest Epoch Difference

Soft Error Condition

On a soft error, the Guest Epoch Difference will be reloaded with 0. If there was a current Logical Processor in Guest mode, then a Timer Facility Damage will be generated for the Logical Processor.
  a. Set Guest Epoch Difference to 0.
  b. If there was a current Logical Processor in Guest mode, then set a pending Timer Facility Damage for the Logical Processor.
  c. Exit Timer Checks.

Hard Error Condition

The loss of this timer only affects Logical Processors if they use the facility, i.e., only if Guest mode entered. However, we don't necessarily know if a given domain will use the facility or not so vacate the CPU just in case it does. A domain will be impacted if the domain's Logical Processors were in Guest mode and not reassigned to other CPUs or the domain's current Logical Processor was in guest mode. The residual affect for Logical Processors that still remain on this CPU will be a Processing Damage Machine Check for Start Interpretive Execution. For Set Clock and Store Clock issued in Guest mode, the appropriate Condition Code will be generated by emulation for Set Clock and by hardware for Store Clock. This prevents any further use of the timer.
  a. Set Processor Save Area Extension damage flag of the Guest Epoch Difference.
  b. Invoke Recovery Quiesce.
  c. Call vacate routine which returns a list of Logical Processors that had affinity for this CPU.
  d. Loop through list of Logical Processors and if the Logical Processor was current and in Guest mode then set up pending Timer Facility Damage and if the Logical Processor was not current, not reassigned and in Guest mode, then set up pending Timer Facility Damage.
  e. Resume from Recovery Quiesce.
  f. Exit Timer Checks.

Internal Interface Changes

Macrocode components that use the timers have to be sensitive to the damage flags. This includes:
1. Timer component—use of CPU Timer.
2. Dispatcher—will have to check for expired Timer Queue Blocks when CPU timer is hard broken.
3. Logical Processor Dispatcher—will have to use CPU Timer if Domain Dispatch Timer is hard broken.
4. Scheduler—use of Run Time Accumulator.
5. Emulation Routines that access/update any domain timers that may be hard broken.

The present invention describes the use of an action latch. Briefly, an action latch allows recovery software to invoke a hardware recovery action once the software completes and system clocks are started. This mechanism greatly simplifies recovery software and allows more extensive, complex recovery actions to take place.

Error handling in previous processors have followed the process described below:
  a. The error is detected by some checking logic and an Error History Latch is set.
  b. Some small number of clock cycles later, system clocks are turned off and error recovery software is invoked.
  c. Recovery software, based on history information provided by the hardware, attempts to recover from the error.
  d. If recovery is successful, processing continues.

Historically, error recovery software has been extremely complex and difficult to test/validate. One of the leading causes of this problem has been the need for recovery software to issue multiple system clocks as part of its recovery actions.

The present invention is used within a computer system having a number of circuits and error detection circuitry for detecting errors in the circuits and providing error signals. Error recovery is provided as follows:
1. The error is detected by conventional checking logic.
2. System clocks are turned off and error recovery software is invoked.
3. Recovery software attempts to recover from the error. When a need to invoke a recovery action exists, an appropriate action latch is set.
4. When recovery software completes and system clocks are turned on, the action latch forces the hardware to take recovery action.
5. When the recovery action is completed, the action latch is reset and processing continues.

Operation using a recovery latch is illustrated with the following TABLE 2.

TABLE 2

| Control State | User State |
|---|---|
| | I₁ Execute |
| | I₂ Execute |
| | I₃ Execute |
| | . |
| | . |
| | . |
| | I₈ Execute, Error Detected ← |
| Stop Clock And Recover | |
| SI₁ Execute | |
| SI₂ Execute | |
| SI₃ Execute | |
| . | |
| . | |
| . | |
| SIₘ Set Action Latch | |
| Return to User → | |
| | I₈ Execute Completed, Action Latch Set |
| | ← Interrupt |
| SIₘ ReSet Action Latch | |
| Return to User → | |
| | I₉ Execute |
| | I₁₀ Execute |

Action latches can be used extensively throughout the computer system. For example, in the instruction unit action latches are used for the following purposes:

a. Interrupts: For certain related interrupts, such as malfunction alert, domain damage, and external damage, the interrupt is generated through the use of an action latch. The action latch is cleared when the appropriate interrupt is taken.

b. Checkstop Entry: When appropriate, recovery software can force the CPU to enter check stop state when system clocks are turned on. This action latch is reset on entry to check stop state.

c. Timer Facility Recovery: When recovery software detects that a free running timer register (e.g., the Time Of Day clock) is damaged, an action latch can be set that will set the appropriate register's Error bit, effectively marking it as damaged, when clocks resume.

d. Instruction Retry: When appropriate, recovery software can set an action latch that will mark a certain instruction unit pipeline state (e.g., A segment) to be damaged. When the algorithm flow in that segment completes an instruction retry will be forced.

While the invention has been particularly shown and described with reference to preferred embodiments thereof it will be understood by those skilled in the art that various changes in form and details may be made therein without departing from the spirit and scope of the invention.

We claim:

1. A method for handling errors in a computer system comprising the steps of:
   detecting an error with checking logic;
   turning off system clocks;
   invoking error recovery software;
   executing recovery software to recover from said detected error;
   setting of an action latch by said recovery software;
   turning on system clocks;
   executing hardware recovery action in response to the setting of said action latch for establishing a system environment for initiation of system processing in said computing system;
   resetting said action latch after said system environment has been established; and
   initiating system processing.

2. The method of claim 1 wherein:
   said step of setting said action latch sets an interrupt action latch; and
   said step of executing said hardware recovery causes interrupts to be generated in said computing system when said clock is turn on and before system processing can be initiated.

3. The method of claim 1 wherein:
   said step of setting said action latch sets a clock action latch; and
   said step of executing said hardware recovery causes said clocks to be reestablished and synchronized in said computing system when said clock is turn on and before system processing can be initiated.

4. The method of claim 1 wherein:
   said step of setting said action latch sets a retry action latch; and
   said step of executing said hardware recovery causes said computing system to establish a state for retrying the instruction whose processing gave rise to said detected error when said clock is turn on and before said computer system processing can be initiated to retry said instruction.

5. The method of claim 1 wherein:
   said step of setting said action latch sets a timer action latch; and
   said step of executing said hardware recovery causes said timers either to be removed, reset or emulated in said computing system when said clock is turn on and before said computer system can initiate said computer system processing.

* * * * *